S. D. BLACK & A. G. DECKER.
DRILL GEARING.
APPLICATION FILED MAR. 23, 1916.
1,229,401.
Patented June 12, 1917.
3 SHEETS—SHEET 1.
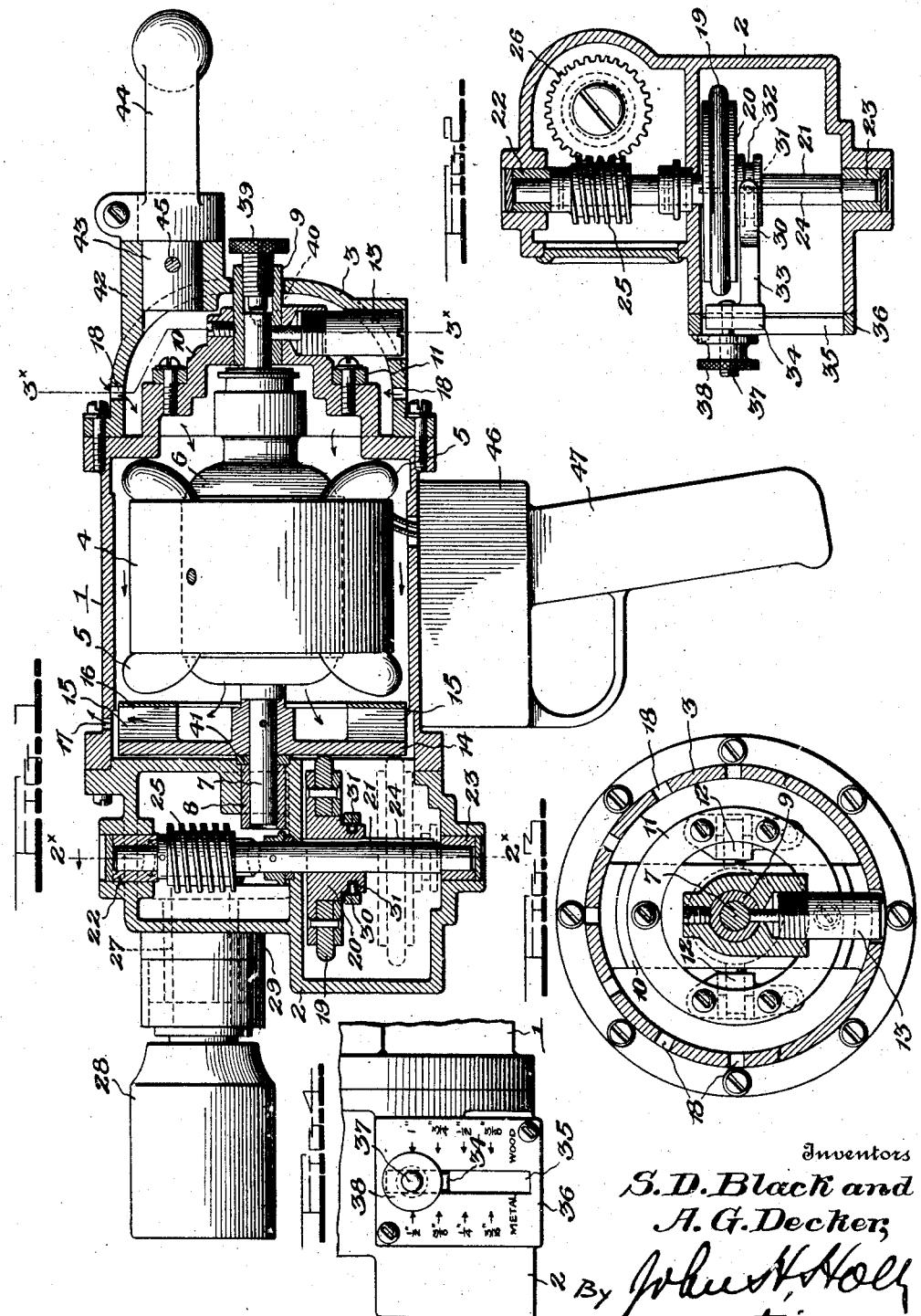
Inventors
S. D. Black and
A. G. Decker,
By John H. Holt
their Attorney

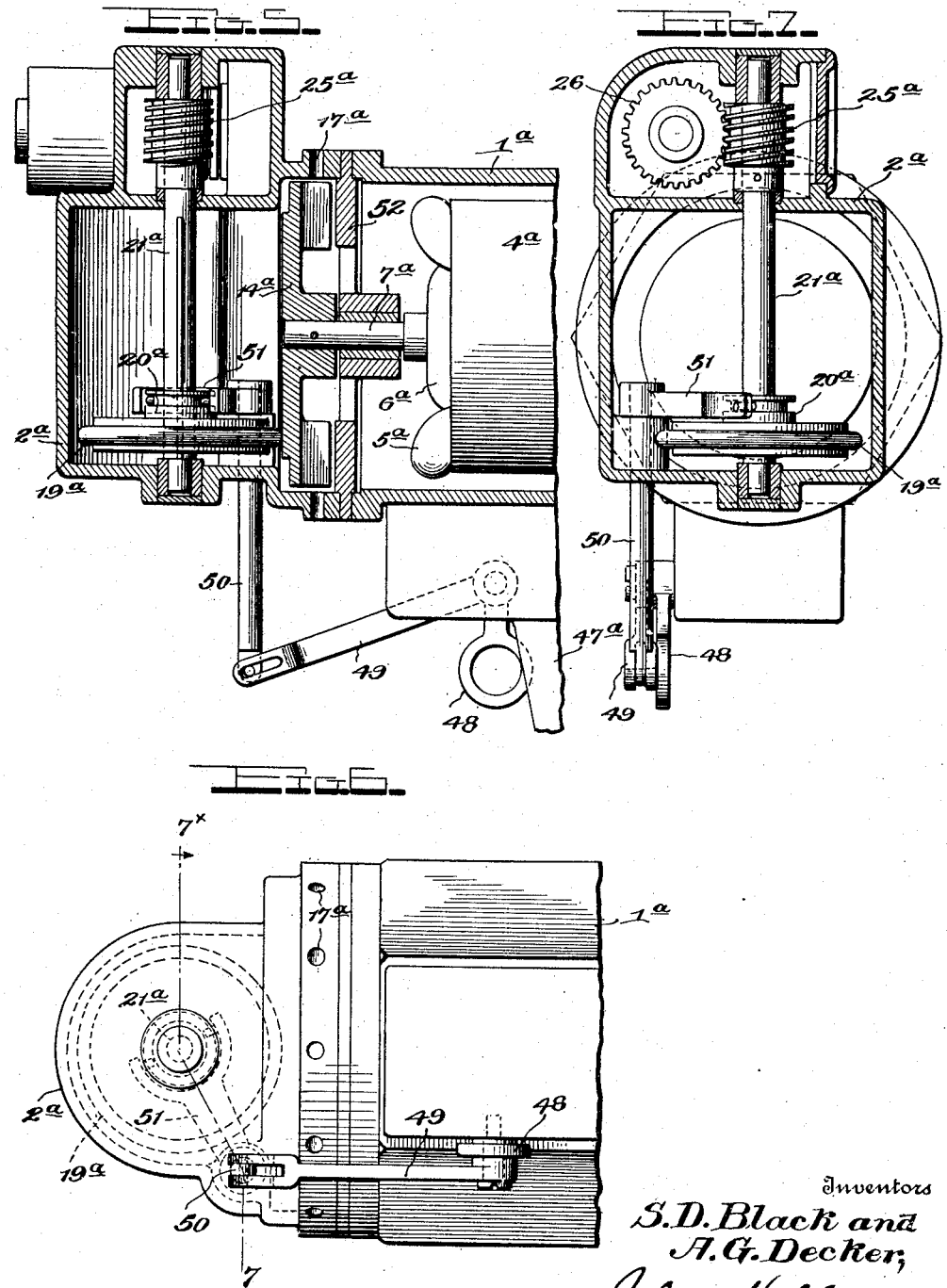

S. D. BLACK & A. G. DECKER.
DRILL GEARING.
APPLICATION FILED MAR. 23, 1916.
1,229,401.
Patented June 12, 1917.
3 SHEETS—SHEET 3.
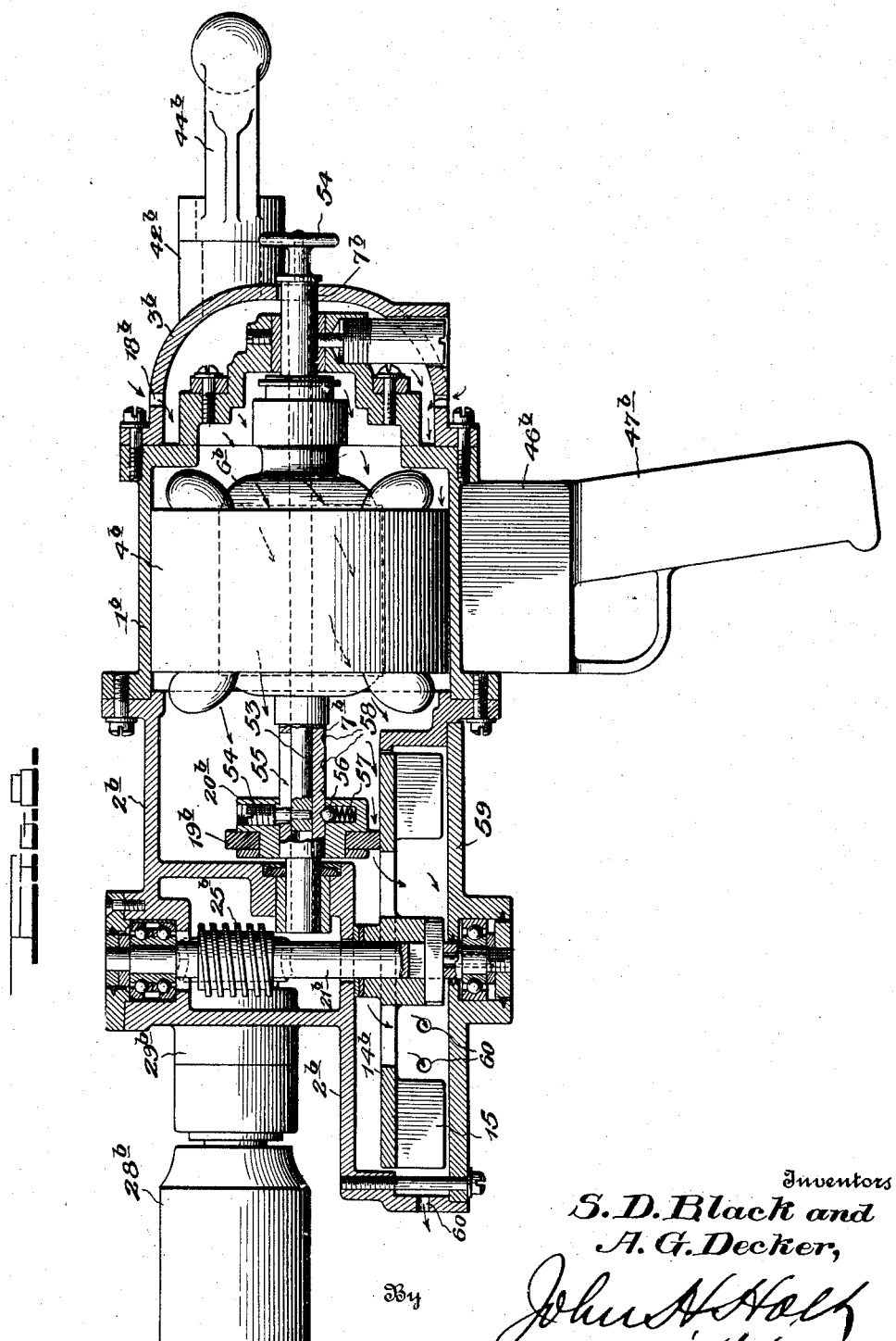
Inventors
S. D. Black and
A. G. Decker,
By John H. Holt
their Attorney

UNITED STATES PATENT OFFICE.

SAMUEL D. BLACK, OF BALTIMORE, AND ALONZO G. DECKER, OF ORANGEVILLE, MARYLAND.

DRILL-GEARING.

1,229,401.  Specification of Letters Patent.  Patented June 12, 1917.

Application filed March 23, 1916. Serial No. 86,237.

*To all whom it may concern:*

Be it known that we, SAMUEL D. BLACK and ALONZO G. DECKER, citizens of the United States, residing at Baltimore city and Orangeville, in the county of Baltimore, respectively, and State of Maryland, have invented certain new and useful Improvements in Drill-Gearing, of which the following is a specification.

The primary object of this invention is the provision in a portable drill of a variable speed disk drive between the power motor of the drill and the chuck spindle or such other member as drives the drill directly.

Another object of the invention is to utilize an element of this disk drive as a fan for creating an air draft to cool the motor.

In order to more fully describe this invention, reference will be had to the accompanying drawings wherein, Figure 1, is a central vertical section, partly in elevation, of a drill embodying one form of our invention;

Fig. 2, a section on the line $2^x$—$2^x$, Fig. 1, looking in the direction of the arrow;

Fig. 3, a section on the line $3^x$—$3^x$, Fig. 1, looking toward the left;

Fig. 4, a fragmentary detail elevation showing the clamping plate and set screw for holding the movable disk in an adjusted position and the scale of speeds;

Fig. 5, a fragmentary vertical section partly in elevation of a modified arrangement for shifting one of the transmission disks;

Fig. 6, a bottom plan of the parts shown in Fig. 5;

Fig. 7, a section on line $7^x$—$7^x$, Fig. 6, looking in the direction of the arrow, and Fig. 8, a vertical central section partly in elevation of another modification embodying our said invention.

Referring first to the form of our drill shown in Figs. 1 to 4 inclusive, this comprises a main casing built up of three separable sections, a central section 1, open at each end, a forward end section 2 opening into section 1, and bolted thereto; and a rear end section 3 opening into section 1.

Located within casing section 1, is an electric motor of which 4 indicates the field magnet fixed to the interior of casing 1, 5 the field coils, 6 the armature, and 7 the armature shaft. The armature shaft of the motor is journaled at one end in a bearing 8 in casing section 2, and at its other end in a bearing 9 in a bracket or spider 10, forming an extension on the central casing section 1. This bracket also carries a ring 11 which supports the motor brush holders 12. 13 indicates an oil or grease cup.

Mounted fast on the armature shaft 7, between the armature and bearing 8, is a disk 14 having a series of vanes 15 normal to its inner face. While there are only two of these vanes shown, there are actually twelve on the drill illustrated. Made fast to the outer edges of these vanes is an annular plate or ring 16. Casing section 1 is provided with a series of air outlets 17, and the casing section 3 is provided with a series of air intake passages 18, so that when the armature shaft 7 is in rotation, a constant stream or current of air will be caused to flow past the motor within casing section 1 and out through outlets 17, created by the action of the fan composed of disk 14 and vanes 15, thus keeping the motor cool.

The outer face of driven disk 14 is in frictional engagement with a driven disk 19, preferably of fiber, fast on a hub 20 slidable longitudinally of a shaft 21 journaled at its opposite ends in bearings 22 and 23, mounted in casing section 2. Hub 20 is prevented from rotating on shaft 21, by a key or feather 24. Shaft 21 carries a worm 25 fast thereto and meshing with a gear 26 fast to a spindle 27 which drives the drill chuck 28. This chuck spindle extends through a collar 29, on casing section 2, and into said casing wherein is located gears 25 and 26, and disk 19 as shown.

For the purpose of changing the ratio of the speed of the chuck spindle or drill bit to that of the motor armature shaft, disk 19 is shiftable longitudinally of its shaft 21 so as to vary its distance from the center of disk 14 and may be secured in any of these adjusted positions. For this purpose there is provided a yoke 30, the arms of which are provided with pins or lugs 31 which extend into an annular recess of hub 32. This yoke has an extension or arm 33 terminating at its outer end in a block 34 which is adapted to slide longitudinally of a slot 35 formed in a plate 36 forming a portion of casing section 2. Fixed to this block and extending through slot 35 is a screw threaded stud 37 on which is screwed a milled nut 38 adapted to clamp against plate 36 and thereby hold the disk 19 in an adjusted position. The outer face of plate 36 may be provided with a scale as shown in Fig. 4, indicating the different sized drills to be used for the speeds corresponding to various adjustments of disk 19.

The pressure between disks 14 and 19 may be varied by an adjusting screw 39, acting upon one end of armature shaft 7, preferably through a ball bearing 40, and there is inserted between the outer face of disk 14 and bearing 8, a felt washer 41 which will take up any lateral lost motion of the armature shaft. There is formed on casing section 3 an extension 42 having an opening into which fits a portion 43 of a hand grip or handle 44, parts 42 and 43 being made fast to each other by a cross pin 45. Attached to the lower side of casing section 1 is a switch box 46 from which extends a pistol grip handle 47. The present invention is not concerned with the contents of this switch box or any other means for starting and stopping the motor, so this machine need not be here shown or further referred to.

In the form of our invention illustrated in Figs. 5 to 7, inclusive, the shiftable disk which here will be indicated 19$^a$ is shifted by the operation of a trigger 48 mounted adjacent the pistol grip 47$^a$ and operating through a link 49 upon a vertically movable rod 50 which extends through the forward casing section 2$^a$ and connects with a yoke 51, which in turn is operatively connected with the hub 20$^a$ of the shiftable disk 19$^a$. In this case the driving disk 14$^a$ is located in the forward casing section 2$^a$, and a fixed ring 52 is inserted between this section and section 1$^a$. Ring 52 takes the place of the annular plate or ring 16, Fig. 1. The parts bearing numerals with exponents $a$ in these views (Figs. 5 to 7) correspond to parts bearing similar numerals in the foregoing views, without such exponents.

Referring now particularly to Fig. 8, in this form of our invention the shiftable disk is the driving disk, or the one directly connected to the armature shaft, and the shifting of the disk is effected through the operation of an adjusting rod which extends longitudinally down the center of the armature shaft. In this case 7$^b$ indicates the armature shaft which is made hollow, and into the bore of which extends a rod 53 on the rear end of which is fixed a head or button 54 for shifting the rod longitudinally. The hub 20$^b$ of the shiftable disk 19$^b$ makes a driving connection with the armature shaft through a screw 54 which extends into a longitudinal slot 55 in shaft 7$^b$, and also into rod 53. This connection permits disk 19$^b$ to be shifted longitudinally of shaft 7$^b$ by rod 53, but said disk is always rotatable with said shaft.

Disk 19$^b$ is retained in its various adjusted positions by a ball 56 under pressure of a spring 57 engaging with any one of several recesses in shaft 7$^b$. In this form of the drill the driven disk 14$^b$ constitutes the fan member. In this case, plate 59, forming the bottom of casing section 2$^b$, takes the place of the annular plates 16 and 52 in the other forms. The cooling air in this case is expelled through outlets 60. The other parts of this drill (Fig. 8) indicated by the numerals bearing exponents $b$ correspond to parts bearing the same numerals, but without exponents in Figs. 1 to 4 inclusive, and need not be further described.

Without limiting our invention to the specific embodiments thereof herein shown, what we claim is:—

1. A power drill comprising a casing, a motor within said casing, a chuck spindle extending into said casing, and driving connection between said spindle and the driving element of said motor, located within said casing and comprising two frictionally connected disks, the periphery of one of which engages a face of the other, means to shift one of said disks with respect to the other to vary the speed ratio of the said chuck spindle with respect to that of said motor element, vanes on one of said disks arranged to create a flow of air within said casing past said motor, said casing being provided with intake and outlet passages for said air.

2. A portable power drill comprising a casing, a motor within said casing, a chuck spindle extending into said casing, and driving connection between said spindle and the driving element of said motor, located within said casing and comprising two frictionally connected disks, the periphery of one of which engages a face of the other, supporting handles secured to said casing, and means to shift one of said disks with respect to the other to vary the speed ratio of the said chuck spindle with respect to that of said motor element, said shifting means including hand controlled actuating means located adjacent one of said handles.

3. A portable power drill comprising a casing built up of separable sections or compartments, one of which constitutes a central section open at each end, and the other two of which constitute end sections removably attached to the respective ends of the central section and opening thereinto, an electric motor mounted in the central section, a chuck spindle extending into one of the end sections, a pair of frictionally connected disks within said casing, one of which is driven by the driving element of said motor, and the other of which is geared to said chuck spindle, the periphery of one of said disks engaging a face of the other of said disks, and means to move one of said disks toward and away from the axis of rotation of the other disk for changing the ratio of the speed of said spindle with respect to that of said motor element.

4. A portable power drill comprising a casing, an electric motor mounted in said casing and having a hollow armature shaft, a chuck spindle extending into said casing, a pair of frictionally connected disks within said casing, one of which is driven by the driving element of said motor, and the other of which is geared to said chuck spindle, the periphery of one of said disks engaging a face of the other of said disks, a hand grip secured to said casing, and means including a rod having one end adjacent said hand grip and extending into the bore of said armature shaft to move one of said disks toward and away from the axis of rotation of the other disk for changing the ratio of the speed of said spindle with respect to that of said motor element.

5. A portable power drill comprising an electric motor having a hollow armature shaft, a chuck spindle, a pair of frictionally connected disks, one of which is driven by the driving element of said motor, and the other of which is geared to said chuck spindle, the periphery of one of said disks engaging a face of the other of said disks, and means including a rod extending into the bore of said armature shaft to move one of said disks toward and away from the axis of rotation of the other disk for changing the ratio of the speed of said spindle with respect to that of said motor element.

6. A portable power drill comprising a casing, an electric motor mounted in said casing and having a hollow armature shaft, a chuck spindle extending into said casing, a pair of frictionally connected disks within said casing, one of which is driven by the driving element of said motor, and the other of which is geared to said chuck spindle, the periphery of one of said disks engaging a face of the other of said disks, and means including a rod extending into the bore of said armature shaft to move one of said disks toward and away from the axis of rotation of the other disk for changing the ratio of the speed of said spindle with respect to that of said motor element.

7. A portable power drill comprising a casing, a motor within said casing, a chuck spindle extending into said casing, and driving connection between said spindle and the driving element of said motor, located within said casing and comprising two frictionally connected disks, the periphery of one of which engages a face of the other, supporting handles secured to said casing, and means to shift one of said disks with respect to the other to vary the speed ratio of the said chuck spindle with respect to that of said motor element, and shifting means including hand controlled actuating means extending through said casing and operable from the exterior thereof.

8. A hand supported portable power drill comprising a casing, one or more handles secured to said casing, a motor within said casing, a chuck spindle extending into said casing, driving connection between said spindle and the driving element of said motor, located within said casing and comprising two frictionally connected disks, the periphery of one of which engages a face of the other, and means to shift one of said disks with respect to the other to vary the speed ratio of the said chuck spindle with respect to that of said motor element.

In testimony whereof we affix our signatures in the presence of two witnesses.

SAMUEL D. BLACK.
ALONZO G. DECKER.

Witnesses:
 JERE J. SANTRY,
 O. W. DIEFFENBACH.

Copies of this patent may be obtained for five cents each, by addressing the "Commissioner of Patents, Washington, D. C."